FREQUENCY CONVERTER FOR RADIO RECEIVING SYSTEMS

Filed Aug. 19, 1947 3 Sheets-Sheet 1

Inventor
Eric Osborne Willoughby
By R. P. Morris
Attorney

FREQUENCY CONVERTER FOR RADIO RECEIVING SYSTEMS

Filed Aug. 19, 1947 3 Sheets-Sheet 2

Inventor
Eric Osborne Willoughby
By R. Morris
Attorney

Feb. 26, 1952 E. O. WILLOUGHBY 2,586,895

FREQUENCY CONVERTER FOR RADIO RECEIVING SYSTEMS

Filed Aug. 19, 1947 3 Sheets-Sheet 3

Inventor
Eric Osborne Willoughby
By R. F. Morris
Attorney

Patented Feb. 26, 1952

2,586,895

UNITED STATES PATENT OFFICE 2,586,895

FREQUENCY CONVERTER FOR RADIO RECEIVING SYSTEMS

Eric Osborne Willoughby, London, England, assignor to International Standard Electric Corporation, New York, N. Y., a corporation of Delaware Application August 19, 1947, Serial No. 769,441
In Great Britain March 15, 1946

Section 1, Public Law 690, August 8, 1946
Patent expires March 15, 1966

9 Claims. (Cl. 250—20)

This invention relates to ultra high frequency radio receiving systems. In particular, it relates to ultra high frequency radio receiving systems of heterodyne beat reception type.

It is a principal object of the present invention to provide an ultra high frequency heterodyne radio receiving system using a balanced slot aerial construction energised both by the received waves and by the heterodyning oscillator, and a balanced detector arrangement.

It is another object of the present invention to provide a balanced slot aerial receiving system for an ultra high frequency radio altimeter of the type in which the transmitted wave is cyclically modulated over a predetermined frequency range, and in which the wave energy received by reflection from the earth is beaten against the contemporaneously emitted transmitter wave to yield a beat frequency indicative of the altitude of the apparatus.

According to a feature of the invention there is provided a balanced heterodyne detection radio receiving system comprising a balanced slot serial arrangement, a heterodyne oscillator, two like detectors, and means for deriving heterodyne beat frequency output energy from said two detectors, said slot serial arrangement comprising two like electrically coupled slot aerials positioned symmetrically side by side in a common first conductive sheet, said detectors being coupled to respective slot aerials at predetermined distances therealong with like-poled electrodes galvanically connected to respective adjacent edges of said slot aerials and the other electrodes coupled to respective non-adjacent edges by means having low impedance at the frequency of the received waves and high impedance at the heterodyne beat frequency, and said heterodyne oscillator having two output terminals and being coupled to both said slot aerials at points similarly situated therealong, one of said output terminals being coupled to points on the adjacent edges and the other output terminal to points on non-adjacent edges of said slot aerials.

According to another feature of the invention there is provided a balanced heterodyne-detection radio receiving system comprising a balanced slot aerial arrangement, a heterodyne oscillator, two like detectors, and means for deriving heterodyne beat frequency output energy from said two detectors, said slot aerial arrangement comprising a single slot aerial of shape symmetrical about its longitudinal axis and positioned in a first conductive sheet, and a conducting member galvanically connected to each end of said slot aerial and positioned to run parallel to the longitudinal axis of said slot aerial in a plane normal to the plane of said slot aerial and containing the said longitudinal axis, said detectors being coupled to said slot aerial and to said conducting member at a predetermined distance therealong, like-poled electrodes of said detectors being galvanically connected to said conducting member and the other electrodes being coupled to respective edges of said slot aerial by means having low impedance at the frequency of the received waves and high impedance at the heterodyne beat frequency, said heterodyne oscillator having two output terminals and being coupled to said slot aerial and to said conducting member at points similarly situated therealong, one of said output terminals being coupled to said conducting member and the other said output terminal being connected to points on each edge of said slot aerial.

The nature of the invention will be more fully understood from the following detailed description with reference to the accompanying drawings, in which Fig. 1 is a diagram illustrative of the principle of the invention as applied in one class of embodiments.

It is to be understood that none of these drawings are to scale, and that the dimensions of relatively small parts shown thereon have been considerably exaggerated wherever helpful in the interests of clarity.

Figure 1:
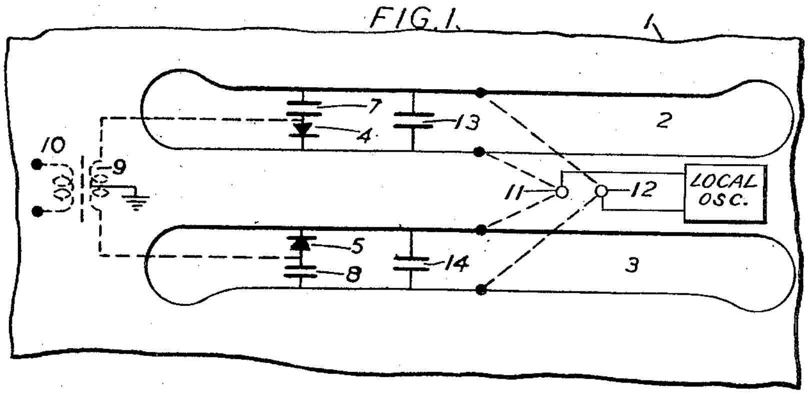

Referring now to Figure 1 which illustrates diagrammatically the principle of the invention in its most simple embodiment there is shown a metal sheet 1 in which are two like slot aerials 2 and 3 located symmetrically side by side and in close proximity to each other so as to be tightly coupled. Connected to adjacent edges of slot aerials 2 and 3 are like-poled electrodes of crystal detectors 4 and 5, the other electrodes of these detectors being connected to the non-adjacent edges of the aerials through condensers 7 and 8 respectively, these condensers having low reactance at the received wavelength and high reactance at the beat frequency. The junctions between the crystal detectors 4, 5 and their respective coupling condensers 7, 8 are connected to the primary winding 9 of the beat frequency transformer, the centre point of winding 9 being connected to "earth," i. e. to the metallic sheet containing the slot aerials. The receiver output is taken from the secondary winding 10 of the beat frequency transformer. This output is derived from beats between the energy received by the slot aerial system and the energy injected from a local oscillator, which may be of any convenient type known in the art, and of which two output terminals 11 and 12 are shown. Terminal 11 is connected to adjacent edges of the slot aerials while terminal 12 is connected to the two non-adjacent edges. The crystal detectors are thus energised both by the received high frequency energy and by the energy injected from the local oscillator but owing to the balanced nature of the aerial system together with the method of injecting the heterodyning oscillation, the aerial system, while responsive to waves received from a distant source, does not radiate the heterodyning energy. The slot aerials are each of length between one half and one quarter of the operating wavelength, and the position of the detectors 4 and 5 should be chosen so as to obtain a good impedance match, the impedance presented to the detectors increasing as the detector is moved towards the mid point of the slot aerial. In addition, small trimming condensers 13 and 14 are provided whereby unbalance of the system which may arise from the detectors may be compensated. The position of these trimming condensers may be found experimentally but in general it will be found satisfactory if they are located at the mid point of the aerials. The width of the slot aerials should be of the order of $^1/_{100}$ of the operating wavelength, a satisfactory spacing between the slots, i. e. between adjacent edges, being twice the slot width, corresponding to tight coupling. By changing the width of the slot the band width may be controlled, increasing the width of the slot making the aerial less reactive in character and increasing the band width.

Figure 2A:
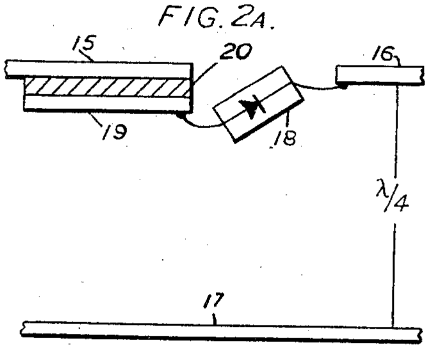
Figs. 2A, 2B and 3 illustrate constructional details applicable to various embodiments of the invention.
Figure 2B:
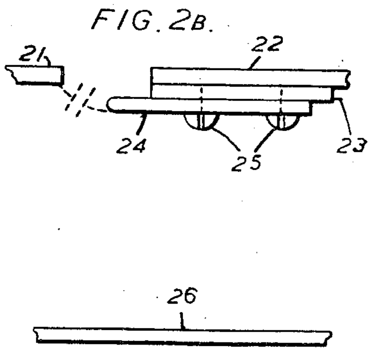

The aerial system as shown in Figure 1 as bidirectional being responsive to oscillations incident on either surface of the metallic sheet 1. By the use of another reflecting sheet parallel to sheet 1 and spaced therefrom by a quarter wavelength, the aerial system may be made unidirectional. Such a reflecting sheet is indicated in Figures 2A and 2B which illustrate details of construction which may be used in various embodiments of the invention. Referring to Figure 2A, 15 and 16 represent the sections through the metallic sheet 1 bounding one of the slot aerials. Parallel to 15 and 16 is reflecting sheet 17. Connected to one edge of 16 is an electrode of crystal detector 18, the other electrode being connected to a metal plate 19 insulated from 15 by a thin layer of insulation 20. The capacity between 19 and 15 completes the high frequency circuit for the detector 18 and corresponds to one of the condensers 7 and 8 of Figure 1. The detector shown by 18 may be of any convenient type such as for example an insulating cartridge mounting containing a silicon electrode with tungsten wire catwhisker.

In Figure 2B there is shown an example of means for providing the trimming capacity 13 of Figure 1. References 21 and 22 represent the sections through respectively an adjacent and a non-adjacent edge of one of the slot aerials. 23 is merely a metal spacing plate whereby the condenser electrode 24 is spaced out from 22. The trimming capacity is the capacity between the tip of electrode 24 and the edge 21 of the slot aerial. Electrode 24 is adjustably clamped to 22 by means of screws 25 which pass through slots in the electrode, the position of which may therefore be adjusted to give the required value of tuning capacity. In this figure reflecting plate 26 is shown spaced as before ¼ wavelength from the slot.

Figure 3:
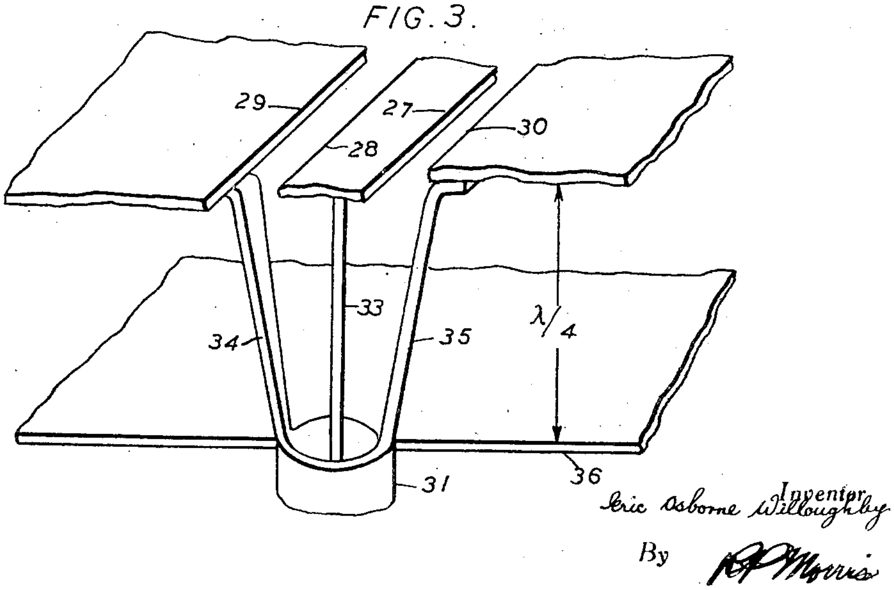

In Figure 3 is shown means for applying the injected heterodyning voltage to the slot aerials. In this figure the two slot aerials have adjacent edges 27 and 28 and non-adjacent edges 29 and 30. The voltage from two output terminals of the heterodyne oscillator is fed to the receiver ever coaxial transmission line 31, the inner conductor 33 of which is connected directly to the metal sheet between the adjacent edges 27 and 28. The outer conductor is extended by conductor strips 34 and 35 to make connection to the slot edges 29 and 30. A reflecting sheet 36 is also indicated spaced apart from the plane of the slot aerials by ¼ wavelength and the coaxial transmission line 31 terminates at this reflecting sheet, to which its outer conductor is connected, and is merely carried on by the inner conductor 33 and the branch strips 34 and 35. By changing the breadth of these branch strips the characteristic impedance of the short circuited transmission line formed thereby may be adjusted so as to ensure minimum loss of the received energy by providing a high impedance transmission line network between the non-adjacent edges 29 and 30 of the slot aerial system and the reflector sheet 36.

Figure 4:
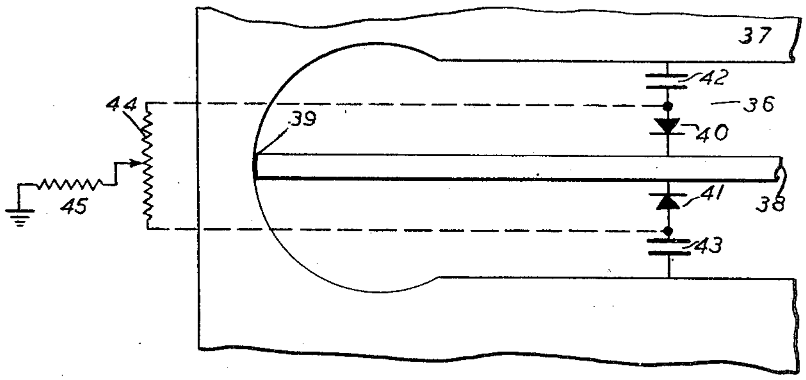
Fig. 4 is a diagram illustrating the principle applied in another class of embodiment of the invention.

Instead of using two slot aerials in the manner hereinbefore described with reference to Figures 1 to 3, a single slot aerial symmetrical about its longitudinal axis may be used, this aerial being in effect bisected by a heavy conductor running parallel to the length of the slot but displaced perpendicularly from the plane of the slot by a small amount and connected to the two ends of the slot aerial itself. A part view of such an arrangement is shown diagrammatically in Figure 4 in which a single slot aerial 36 in a metal sheet 37 is bisected by the heavy conductor 38 which is connected to the metal sheet 37 at the end 39 of the slot aerial. Detectors 40 and 41 are galvanically connected with like-poled electrodes to this centre conductor, their other electrodes being coupled through condensers 42 and 43 to the edges of the slot in an analogous manner to the detector coupling to the outer edges of the two slot aerials illustrated Figure 1. The junction points of the detectors and their associated coupling condensers are in this case connected to a potentiometer resistance 44, and the output load, represented as a resistance 45, is connected between "earth" and a variable tapping on a potentiometer. It will be obvious that a transformer output circuit as illustrated in Fig. 1 might equally well be used. The heterodyning oscillator injection system used with such a single slot arrangement is similar to that shown in Figure 3 except that the centre conductor of the coaxial cable is connected to the bisecting conductor 38 while the outer conductor of the coaxial cable is connected through strip conductors to the two edges of the slot aerial 36. Such a slot aerial system may of course be used in conjunction with a reflecting sheet as described with reference to the preceding figures.

Figure 5:
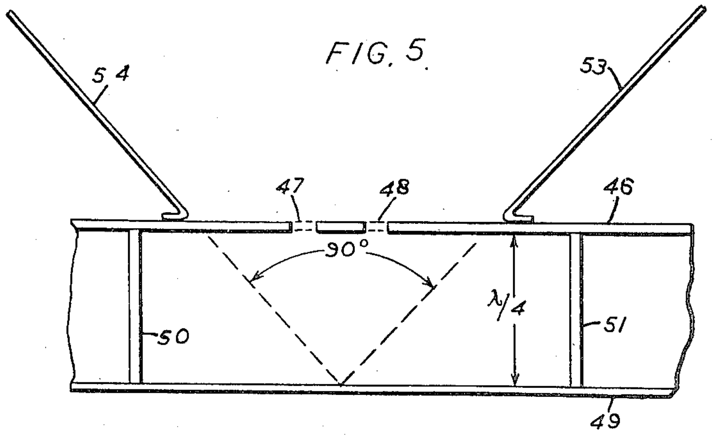
Fig. 5 is a section view illustrating the part an embodiment of the invention including back and corner reflectors, with slot aerials in a flat surface.

It has already been pointed out that the slot aerial system may be rendered unidirectional by means of a reflector plate located a ¼ wavelength distant from the slot aerial system. If desired, further directivity may be obtained by means of a corner reflector system mounted on the side of the slot aerial plane remote from the reflector plane. The apex of the corner being perpendicular to a parallel for the longitudinal axis of the slot aerial system according to the directionity required. Such an arrangement is shown in Figure 5 in which is shown a part section through an assembly using two slot aerials in the manner illustrated in Figure 1. Referring to Figure 5, 46 represents a metal plane in which are located two parallel slots 47, 48. Reference 49 represents another metallic sheet spaced from 46 by ¼ wavelength and serving as a reflector for the slot aerials. 50 and 51 are side walls and in conjunction with 46 and 49 and two other side walls not shown, form a complete cavity of which the slot aerials are the effective apertures, the only other openings into the cavity being those necessary for the heterodyning voltage feed through the coaxial cable arranged in the manner shown in Figure 3 and for the crystal output detector leads which may be taken to a compartment on the left of wall 50 or on the right of wall 51 so that the output circuit is screened from cavity. The corner reflector is composed of two flat metal sheets 53 and 54 which are arranged so that their planes form a V the apex of which includes an angle of substantially 90° and lies on the reflector 49 on a line parallel to and opposite the longitudinal axis of the slot aerial system. Each reflector plate preferably has a length of substantially ½ wavelength along its intersection with sheet 46 and should also measure substantially ½ wavelength from its outer edge to the apex. Such reflector plates may conveniently be mounted by flanging and welding where they come in contact with 46, but any other convenient means of mounting may be adopted provided that a galvanic connection is secured between the reflector plates and sheet 46 along the intersection for at least a distance of half wavelength.

Figures 6, 7:
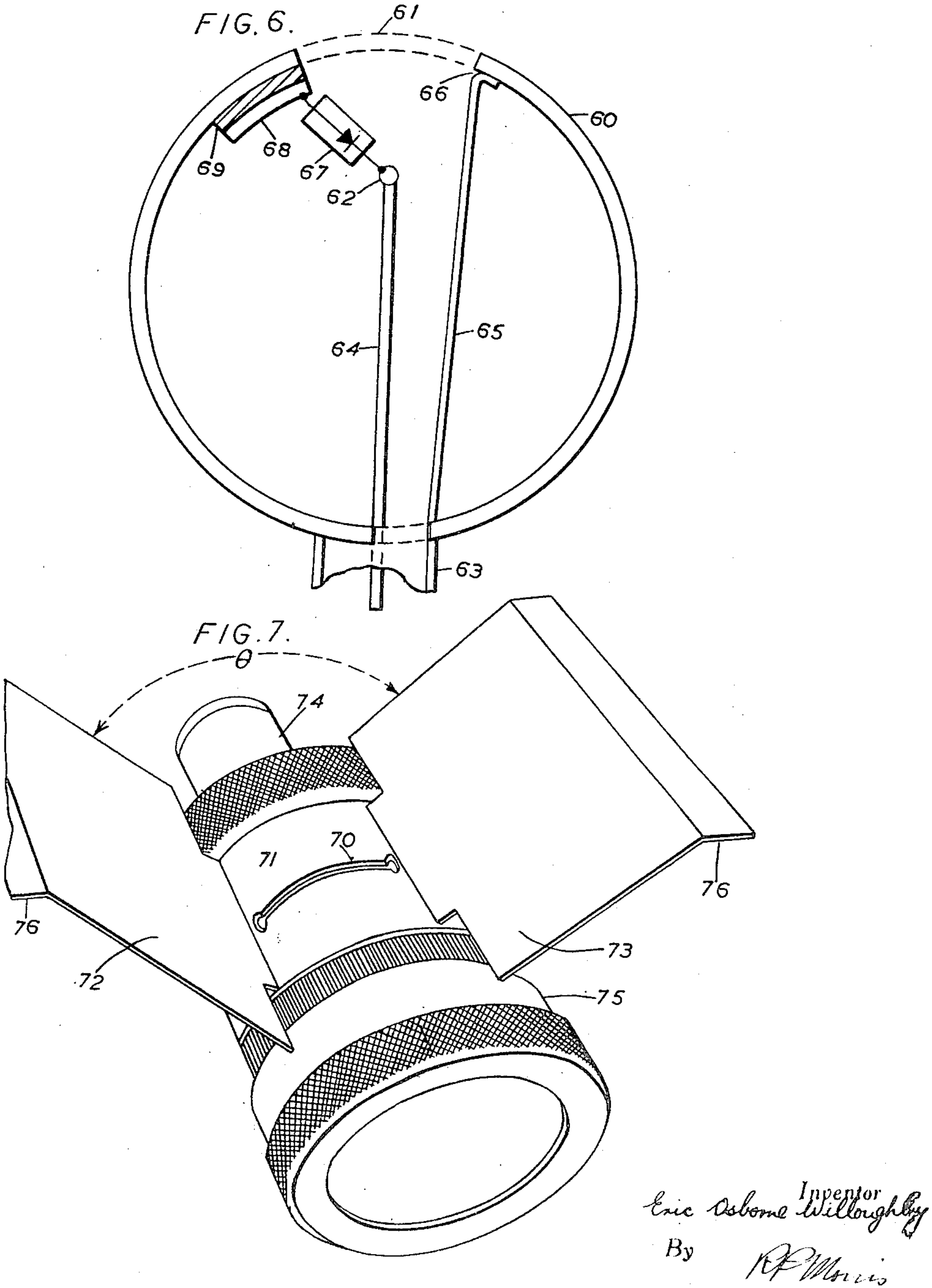
Fig. 6 is a section view illustrating a detail of an embodiment of the invention with slot aerial in a cylindrical surface.
Fig. 7 is a perspective view of a receiving arrangement utilising the structure a detail of which is shown in Fig. 6.

In the embodiments so far discussed the slot aerials have been located on flat surfaces. They are not, however, so restricted, and Figure 6 illustrates in part an adaptation of the invention to the case in which a single slot aerial is located on a cylindrical surface. Referring to Figure 6, reference 60 denotes a cylindrical metal surface in which is located a single slot aerial 61 bisected by a wire conductor 62 in the manner described in connection with Figure 4. The diameter of the cylinder is one quarter wavelength, that part of the inner wall of the cylinder which is opposite the slot aerial being thus effective to some extent as a reflector. The coaxial transmission line 63 is fed into the cylinder at a point opposite the slot aerial and is connected with its centre conductor 64 to the bisecting conductor 62 while its outer conductor is lead by two branches (of which only one is shown, reference 65) to make contact with the outer edge of the slot aerial at 66 and also at a corresponding point on the other side of the slot aerial. The detectors are coupled as before between the central conductor 62 and the edges of the slot, through coupling capacities provided in the manner shown in Fig. 6 for one detector 67 by the capacity between the metal plate 68 and cylinder 60 from which plate 68 is insulated by a thin piece of mica or other suitable insulator 69.

As in the case of Figure 5 the directivity of the receiving system of Figure 6 may be increased by the addition of a corner reflector system and this is illustrated in Figure 7. Here the slot aerial 70 is located on the surface of a hollow metal cylinder 71 of diameter ¼ wavelength. The corner reflector is composed of plates 72, 73 which are so located as to have an apex angle of 90°, the apex being on a line one quarter wavelength distant from the centre of the slot system, and perpendicular to the axis thereof. The heterodyning oscillator voltage is lead into the cylinder through a coaxial transmission line (not shown) in a manner before described. The ends of the cylinder 71 are extended into secondary cylinders 74 and 75 in which may be housed the beat frequency output means such as the potentiometer 44 and low resistance 45 of Figure 4 or the beat frequency transformers 9, 10 of Figure 1.

The assembly shown in Figure 7 has been found to be a convenient form for use as the receiving element of a radio altimeter of the frequency sweep type. When used for this purpose the assembly is mounted at an opening in the wing of an aircraft, being secured thereto by screws through the flanges 76 shown on Figure 6. In this case the heterodyning voltage is derived from the local transmitter over a coaxial transmission line and the heterodyne beat frequency obtained at the output of the receiving system is a measure of the altitude and is applied to a frequency indicating circuit to give an indication of the amplitude in the customary manner, as for example, described in the Bell System Technical Journal, volume 18, page 222. "A Terrain Clearance Indicator." It will be obvious that the arrangement of Figure 5 could equally well be used for this purpose.

It will also be evident that if it is desired to confirm reception to a beam limited both in the direction parallel to the axis of the slot aerial system and in a direction perpendicular to the said axis, use may be made of two 90° corner reflectors disposed in space quadrature, one in the same planes as the corner reflector as illustrated in Fig. 5, and the other in the same planes as the corner reflector illustrated in Fig. 7, the reflecting plates of the "two corner" reflectors being combined to form a four-sided metal horn.

What is claimed is:

1. A balanced heterodyne-detection radio receiving system comprising a balanced slot aerial arrangement, a heterodyne oscillator, two like detectors, said slot serial arrangement comprising two like electrically coupled slot aerials positioned symmetrically side by side in a common first conductive sheet, means for deriving heterodyne beat frequency output energy from said two detectors comprising means for coupling, said detectors to respective said slot aerials at predetermined distances therealong comprising means for galvanically connecting like-poled electrodes of said detectors to respective adjacent edges of said slot aerials, means having low impedance at the frequency of the received waves and high impedance at the heterodyne beat frequency coupling, the other electrodes to respective non-adjacent edges, said heterodyne oscillator having two output terminals, means coupling one of said output terminals to points on the adjacent edges and the other output terminal to points on non-adjacent edges of said slot aerials.

2. A radio receiving system according to claim 1, further comprising variable capacity means coupled between the edges of each slot for tuning each said slot aerial to trim the balance of the system.

3. A radio receiving system according to claim 1, in which said detectors are crystal detectors.

4. A radio receiving system according to claim 1 in which the longitudinal axis of each said slot aerial follows substantially the shortest path defined by said first conductive surface between the ends of said slot aerial.

5. A radio receiving system according to claim 4, in which said conductive sheet is substantially flat, a wave reflector for said slot aerial arrangement comprising a second conductive sheet spaced therefrom by substantially one quarter of the wavelength of the received waves.

6. A radio receiving system according to claim 1, in which said slot aerial arrangement comprises a slot wholly positioned in the conducting wall of an otherwise closed hollow metal body so shaped that part of the internal surface thereof is located to act as a wave reflector for said slot aerial arrangement and is spaced from said slot aerial arrangement by substantially one quarter of the wavelength of the received waves.

7. A radio receiving system according to claim 6, comprising a hollow metal body in the form of a rectangular parallelepiped having two opposing walls spaced apart by substantially one quarter of the wavelength of the received waves, said slot aerial arrangement being positioned on one of said opposing walls.

8. A radio receiving system according to claim 1, wherein said first conductive sheet is substantially flat, a wave reflector for said slot aerial arrangement comprising a second conductive sheet spaced therefrom by substantially one-quarter of the wavelength of the received waves, a corner reflector mounted on and galvanically connected to said first conductive sheet on the surface thereof remote from said wave reflector, said corner reflector comprising two substantially flat metal plates symmetrically located with respect to the ends of said slot aerial arrangement in planes forming a V configuration with the apex of the V on the same side of said first conductive sheet as said wave relector, the intersections of said planes with said first conductive sheet being parallel to an axis of said slot aerial arrangement, said plates contacting said first conductive sheet along said intersections.

9. A radio receiving system according to claim 8, in which the length of each said slot aerial is substantially one quarter of the wavelength of the received waves, and in which the planes of the said corner reflector plates make an aperture angle of substantially 90°, the apex of the V configuration formed thereby being spaced substantially one quarter wavelength from said slot aerial arrangement.

ERIC OSBORNE WILLOUGHBY.

REFERENCES CITED

The following references are of record in the file of this patent:

UNITED STATES PATENTS

| Number | Name | Date |
|---|---|---|
| 2,402,622 | Hansen | June 25, 1946 |
| 2,412,003 | Neufeld | Dec. 3, 1946 |
| 2,414,266 | Lindenblad | Jan. 14, 1947 |
| 2,423,088 | Earp | July 1, 1947 |
| 2,424,796 | Carlson | July 29, 1947 |
| 2,433,804 | Wolff | Dec. 30, 1947 |